Feb. 14, 1967  J. M. HANSEN  3,304,383
ELECTRIC MOTOR SPEED CONTROL MECHANISM
Filed July 20, 1965  3 Sheets-Sheet 1
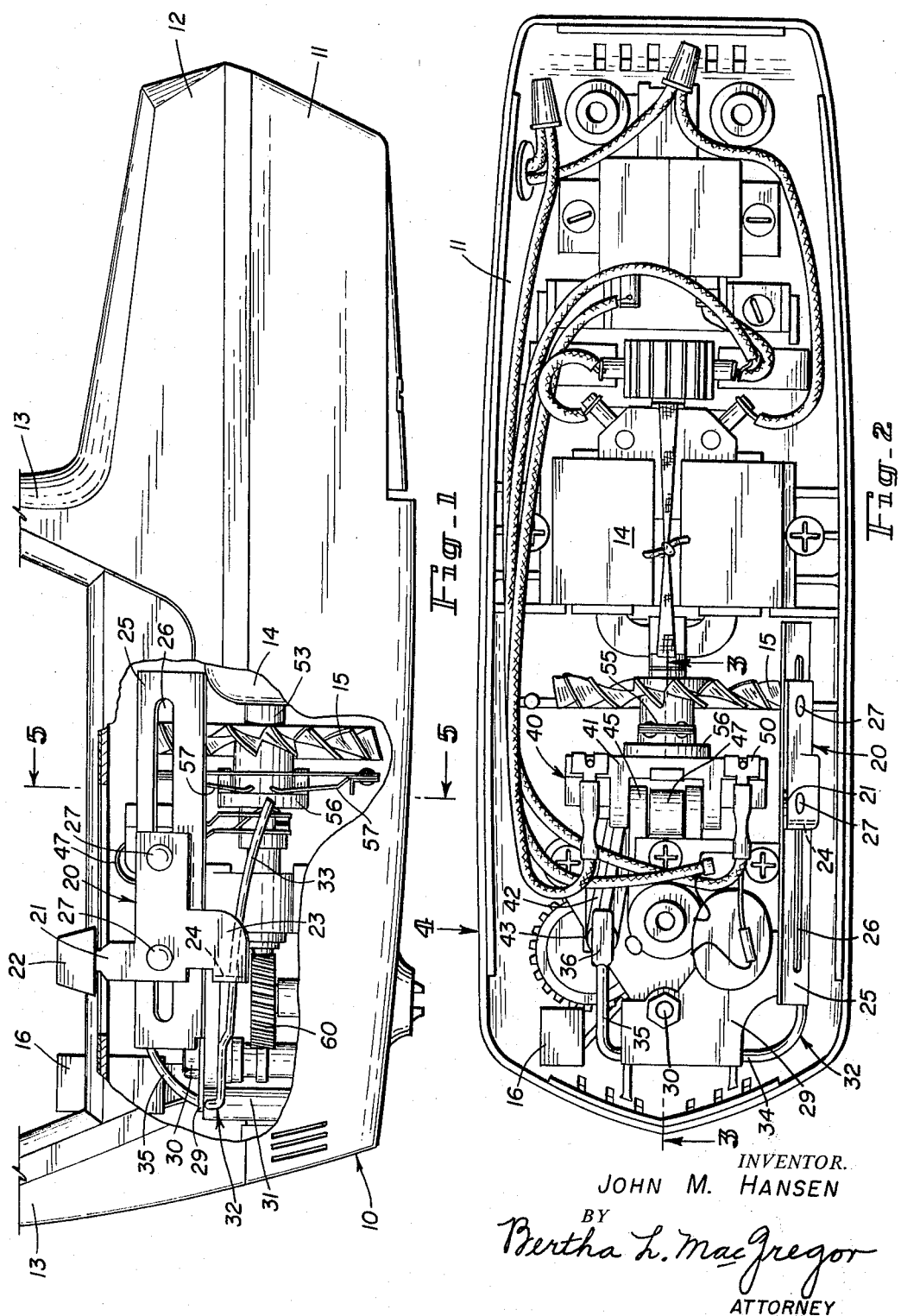
INVENTOR.
JOHN M. HANSEN
BY
Bertha L. MacGregor
ATTORNEY

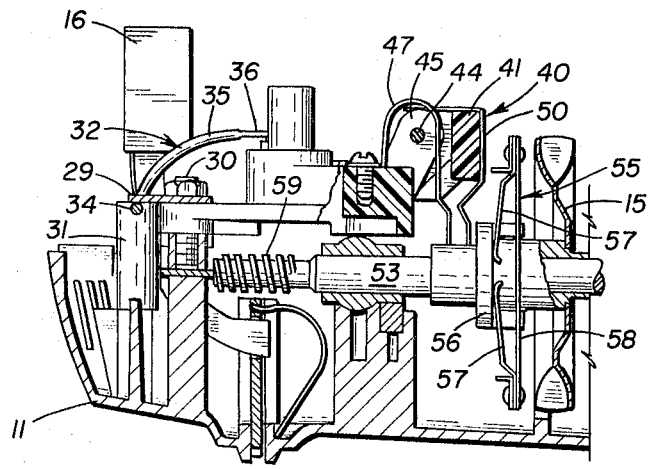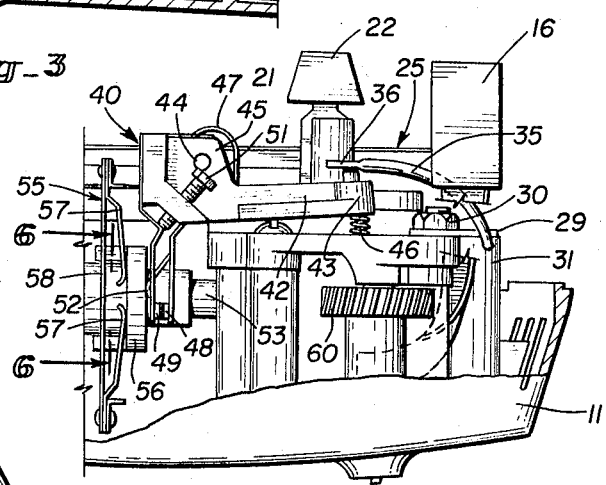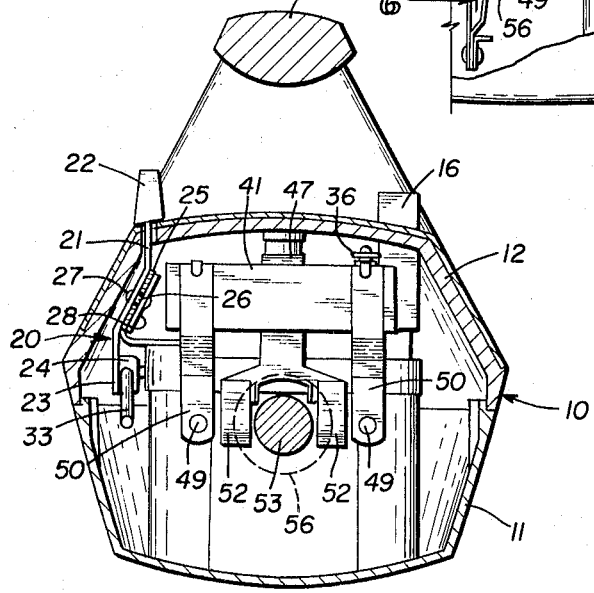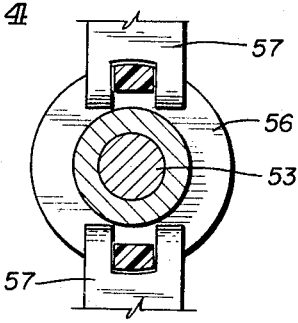

Feb. 14, 1967  J. M. HANSEN  3,304,383
ELECTRIC MOTOR SPEED CONTROL MECHANISM
Filed July 20, 1965  3 Sheets-Sheet 3
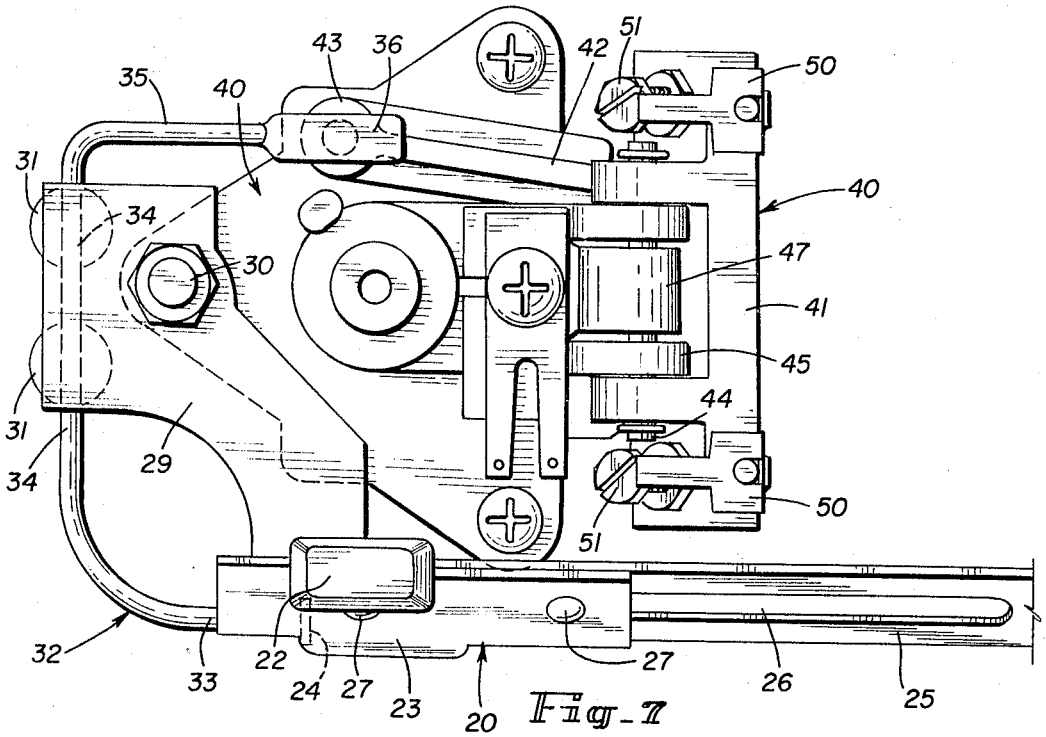
Fig_7
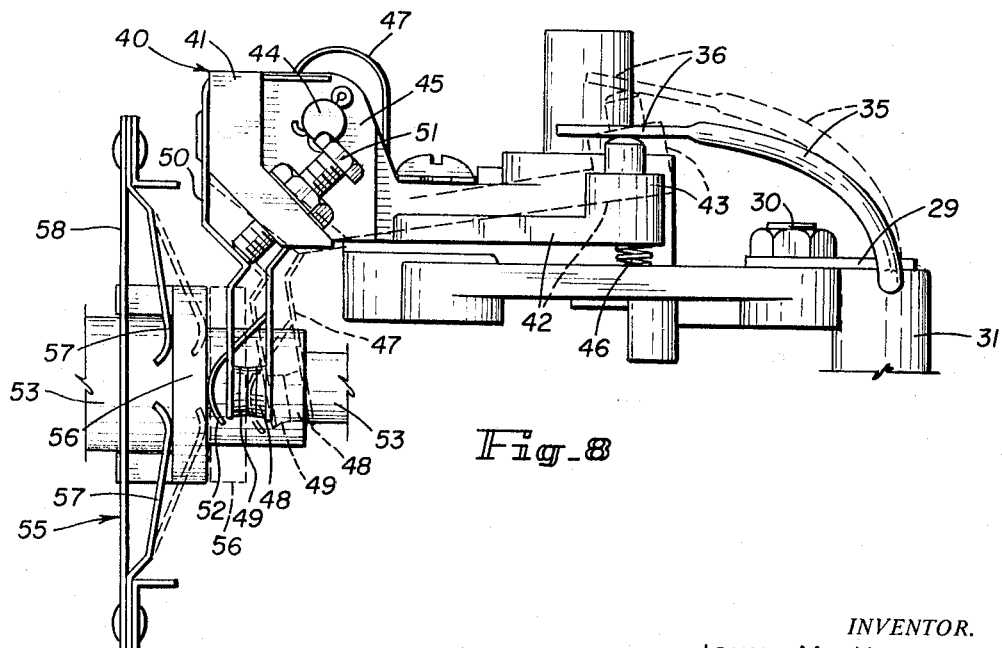
Fig_8
INVENTOR.
JOHN M. HANSEN
BY Bertha L. MacGregor
ATTORNEY

United States Patent Office 3,304,383
Patented Feb. 14, 1967

3,304,383
ELECTRIC MOTOR SPEED CONTROL MECHANISM
John M. Hansen, Racine, Wis., assignor to Scovill Manufacturing Company, Waterbury, Conn., a corporation of Connecticut
Filed July 20, 1965, Ser. No. 473,446
7 Claims. (Cl. 200—80)

This invention relates to electric motor speed control mechanism which may be embodied in the power units of food mixers for driving beater shafts and in power units for operating other tools.

The object of the invention is to provide an efficient dependable governor by which constant motor speeds over a wide range of manually controlled speed settings are maintained notwithstanding variations in load.

The invention as shown and described herein is embodied in speed control mechanism in a food mixer. The speed control mechanism comprises a manually actuated slide member movable in a straight line in a cam bracket to designated positions. Movement of the slide member in the cam bracket actuates a cam rod which controls the positions of a pivotally mounted contact carrying bracket. The relative positions of the contacts are controlled by a centrifugally responsive member of the type shown in U.S. Patent No. 3,013,133 assigned to the assignee of this application.

The construction of the manually actuated mechanism affords the user a wide selection of speeds for performing different kinds of mixing operations.

In the drawings:

FIG. 1 is an elevational side view of a mixer embodying my invention, the housing being partly broken away to disclose the electric motor speed control mechanism.

FIG. 2 is a top plan view of the mixer mechanism, the upper housing having been removed.

FIG. 3 is a longitudinal vertical sectional view in the plane of the line 3—3 of FIG. 2.

FIG. 4 is an elevational view of the speed control mechanism as viewed from the side of FIG. 2 indicated by the numeral "4" and the arrow.

FIG. 5 is a transverse vertical sectional view in the plane of the line 5—5 of FIG. 1.

FIG. 6 is a transverse vertical sectional view in the plane of the line 6—6 of FIG. 4.

FIG. 7 is a top plan view, on an enlarged scale, of the mannually adjustable slide member, cam bracket, cam rod, and pivotally mounted contact carrying bracket.

FIG. 8 is an elevational side view, on an enlarged scale, showing some of the speed control parts of FIG. 4 in different positions in full and broken lines.

In that embodiment of the invention shown in the drawings, a motor driven food mixer 10 comprises a lower housing 11, upper housing 12, handle 13, motor 14, fan 15 and beater ejector 16. The parts associated with the motor, located to the right of the motor in FIG. 2, are conventional parts which do not require description.

The speed control mechanism comprises a slide member 20 with integral upwardly extending arm 21 on which is mounted a knob 22 for manual actuation of the slide. The slide 20 also has an integral downwardly extending arm 23 with an inwardly directed end flange 24 provided with an aperture for reception of a cam rod to be described hereinafter. The slide 20 is slidably mounted in a cam bracket 25 provided with an elongated slot 26. The slide 20 has two rivets 27 extending through the slide and through the slot 26, being retained by a back plate 28 retained by the inner ends of the rivets. The slide 20 and back plate 28 thus held together on opposite sides of the bracket 25, are manually slidably actuated by the knob 22 which registers with indicia on the housing (not shown) adjacent the knob for indicating the speed or type of mixing desired. In the present embodiment, the slot 26 is long enough to accommodate an "Off" position of the knob 22 at the left hand end, and nine different speeds increasing from left to right of FIGS. 1 and 2, for different types of mixing.

The cam bracket 25 is fixedly mounted in the lower housing 11 by an integrally formed plate 29 and screw or bolt 30. The plate 29 rests on the upper ends of a pair of bosses 31 rising from the mixer housing 11 and slotted across their upper ends to receive a cam rod 32. The cam rod is metal bent to form a free end portion 33 which extends longitudinally of the housing through the apertured flange 24 on the downwardly extending arm 23 of slide 20 as shown in FIG. 1, an intermediate transversely extending portion 34 located in the slotted upper ends of the bosses 31 beneath the cam bracket attaching plate 29, and then bent again to form the terminal portion 35 which is parallel to the portion 33 and terminates in a flattened end 36. Sliding movement of the slide 20 in the slot 26 of cam bracket 25 causes the portion 33 of the cam rod 32 to be raised or lowered, and that action causes the intermediate horizontal portion 34 to turn about its own axis, thereby causing the terminal portion 35 and flattened end 36 be raised or lowered.

The raising and lowering of the end 36 of the cam rod adjusts the position of a pivotally mounted contact carrying bracket 40. This adjustment of the pivotal position of the bracket 40 varies the positions of the electrical contacts of two sets of contacts carried by the bracket. The bracket 40 comprises a transversely extending body 41 of insulating material, provided with a longitudinally disposed spring pressed arm 42 having on the upper surface of its free end a boss 43 which underlies and contacts the end 36 of the cam rod 32. The bracket 40 is pivotally mounted on a shaft 44 in a fixed support 45 in the housing 11. A spring 46 urges the bracket arm 42 upwardly against the cam rod end 36. A spring 47 mounted on the support 45 extends downwardly and carries two contacts 48, located near opposite side edges of the spring, for contacting contacts 49 on spring arms 50 attached to the bracket body 41. Two screws 51 are provided for manually adjusting the two sets of contacts 48, 49, relatively to each other.

The contact carrying spring 47 extends transversely across the speed control bracket 40 and is provided between the two contacts 48 with a pair of curved spring members 52 which straddle the motor shaft 53 on which is mounted the centrifugally responsive speed control unit 55. The latter includes a nylon slider button 56 loosely mounted on the shaft 53 in position to be contacted by the spring arms 57 attached at their radially outward ends to the plate 58 by which the centrifugal unit is mounted on the motor shaft 53. Under influence of centrifugal force, due to increased speed of the motor shaft, the plate 58 bends rearwardly in its opposite outer end portions, and the spring arms 57 move away from the plate 58 at their free inner ends, thereby causing the slider button 56 to move toward the spring members 52 of the spring 47, and moving the contacts 48 away from the contacts 49. This momentarily interrupts the contact between the contacts 48, 49, of each set of contacts. The speed decreases due to the momentary breaking of contact, whereupon the speed responsive parts resume their normal positions and the contacts again establish electrical circuits.

The degree of pressure required to be exerted by the centrifugally actuated button 56 to move the contacts 48 away from the contacts 49 is determined by the pivotal position of the contact carrying bracket 40, and that pivotal position is determined by the pressure exerted by the end 36 of the manually adjusted cam rod 32.

Thus the centrifugal control assures operation of the motor at constant speeds for the speed or kind of mixing operation selected by manual setting of the slide member 20 through knob 22.

Changes may be made in details of construction and in the form and arrangement of parts without departing from the scope of the invention defined by the appended claims.

I claim:
1. Electric motor speed control mechanism comprising
   (a) a fixedly mounted cam bracket provided with an elongated slot,
   (b) a manually movable slider mounted on the cam bracket for movement longitudinally in the slot,
   (c) a fixed support adjacent the cam bracket,
   (d) a contact carrying bracket pivotally mounted on the fixed support,
   (e) a yielding contact carrying plate mounted on the fixed support with the contacts of the plate and pivotal bracket in electrical engagement with each other,
   (f) a cam rod having a free end, a pressure exerting end bearing on the pivoted bracket, and an intermediate portion mounted for rocking motion about its axis, means urging the pivoted bracket into engagement with the pressure exerting end, and
   (g) means on the slider engaging opposed surfaces of the free end of the cam rod for raising and lowering said end when the slider is moved in the cam bracket to thereby adjust the pressure exerting end and the position of the pivotally mounted bracket.

2. The speed control mechanism defined by claim 1, which includes centrifugally actuated means mounted to contact the yielding contact carrying plate to momentarily break contact between the contacts of the plate and pivoted bracket in response to increased speed of the motor.

3. The speed control mechanism defined by claim 1, in which the free end and the pressure exerting end of the cam rod extend at approximately right angles to the intermediate portion.

4. The speed control mechanism defined by claim 1, in which the means on the slider engaging the free end of the cam rod for raising and lowering said end is an apertured flange through which said cam rod extends and the slider moves longitudinally of the cam rod when the slider is moved in the slot of the cam bracket.

5. The speed control mechanism defined by claim 1, which includes a pair of bosses each provided with a slot extending across its upper end, in which the cam bracket is provided with a flat mounting plate bearing on and fixedly attached to said bosses, and the intermediate portion of the cam rod extends through said slots between the bosses and the cam bracket mounting plate for rocking motion in said slots.

6. Electric motor speed control mechanism for a food mixer power unit comprising
   (a) a mixer housing having an elongated slot therein,
   (b) a cam bracket having an elongated slot parallel to the mixer housing slot fixedly mounted in the housing,
   (c) a slider mounted on the cam bracket for movement longitudinally in the bracket slot and having an arm extending outwardly through the housing slot for manual adjustment of the slider,
   (d) a fixed support in the housing adjacent the cam bracket,
   (e) a contact carrying bracket pivotally mounted on the fixed support,
   (f) a yielding contact carrying plate mounted on the fixed support with the contacts of the plate and pivotal bracket in electrical engagement with each other,
   (g) a cam rod provided with a free end and with a pressure exerting end bearing on the pivoted bracket, means pivotally mounting said ends for movement in parallel planes, means urging the pivoted bracket into engagement with the pressure exerting end, and
   (h) means on the slider engaging opposed surfaces of the free end of the cam rod for adjusting the pressure exerting end and the position of the pivotally mounted bracket.

7. Electric motor speed control mechanism for a food mixer power unit comprising
   (a) a mixer housing having an elongated slot therein,
   (b) a motor shaft extending longitudinally of the housing,
   (c) a cam bracket having an elongated slot parallel to the mixer housing slot fixedly mounted in the housing,
   (d) a slider mounted on the cam bracket for movement longitudinally of the bracket slot and having an arm extending outwardly through the housing slot for manual adjustment of the slider,
   (e) a downwardly extending arm on the slider,
   (f) a fixed support in the housing adjacent the cam bracket,
   (g) a contact carrying spring pressed bracket pivotally mounted on the fixed support,
   (h) a yielding contact carrying plate mounted on the fixed support transversely of the housing and having the contacts of the plate and pivotal bracket in electrical engagement with each other,
   (i) a cam rod provided with a pressure exerting end bearing on the pivoted bracket and with a free end engaged by the downwardly extending arm on the slider, said arm having means thereon for engaging opposed surfaces of the said free end means pivotally mounting said ends for movement in parallel planes, said free end being curved in the plane of movement thereof whereby adjustment of the slider automatically varies the pressure exerted by said free end of the cam rod, and
   (j) a centrifugally actuated member mounted to contact the yielding contact carrying plate to momentarily break contact between the contacts of the plate and pivoted bracket in response to increased speed of the motor shaft.

References Cited by the Examiner

UNITED STATES PATENTS

| | | | |
|---|---|---|---|
| 2,488,364 | 11/1949 | Zilliotto | 200—80 X |
| 2,671,191 | 3/1954 | Braski | 200—80 X |
| 2,823,549 | 2/1958 | Buckman et al. | 318—325 X |

BERNARD A. GILHEANY, *Primary Examiner.*

H. A. LEWITTER, *Assistant Examiner.*